United States Patent [19]

Zeidler

[11] Patent Number: 4,578,530
[45] Date of Patent: * Mar. 25, 1986

[54] END-TO-END ENCRYPTION SYSTEM AND METHOD OF OPERATION

[75] Inventor: Howard M. Zeidler, Palo Alto, Calif.

[73] Assignee: VISA U.S.A., Inc., San Mateo, Calif.

[*] Notice: The portion of the term of this patent subsequent to Dec. 27, 2000 has been disclaimed.

[21] Appl. No.: 558,916

[22] Filed: Dec. 7, 1983

Related U.S. Application Data

[63] Continuation-in-part of Ser. No. 278,001, Jun. 24, 1981, Pat. No. 4,423,287.

[51] Int. Cl.$^4$ ............................................... H04L 9/00
[52] U.S. Cl. .............................. 178/22.09; 178/22.08; 340/825.34
[58] Field of Search ............... 178/22.08, 22.09, 22.01; 340/825.34

[56] References Cited

U.S. PATENT DOCUMENTS

| | | | |
|---|---|---|---|
| 4,075,460 | 2/1978 | Gorgens | 340/825.34 |
| 4,193,131 | 3/1980 | Lennon et al. | 178/22.09 |
| 4,259,720 | 3/1981 | Campbell | 340/825.34 |
| 4,268,715 | 5/1981 | Atalla | 340/825.34 |
| 4,423,287 | 12/1983 | Zeidler | 235/379 |

Primary Examiner—Salvatore Cangialosi
Assistant Examiner—Aaron J. Lewis
Attorney, Agent, or Firm—Limbach, Limbach & Sutton

[57] ABSTRACT

An efficient end-to-end encryption system including key management procedures for providing secure, financial data communication between a system user at one of a plurality of transaction terminals of one of a plurality of acquirer institutions and one of a plurality of issuer institutions, with selected elements of the data being encrypted, decrypted, and processed using a one-time session key which is similarly encrypted with master keys and efficiently sent along with the specific segments of the request and response messages. A session key authentication code is utilized to prevent the replay of a previously used session key, thereby precluding undetected message replay or undetected message or data element substitution or insertion.

12 Claims, 14 Drawing Figures

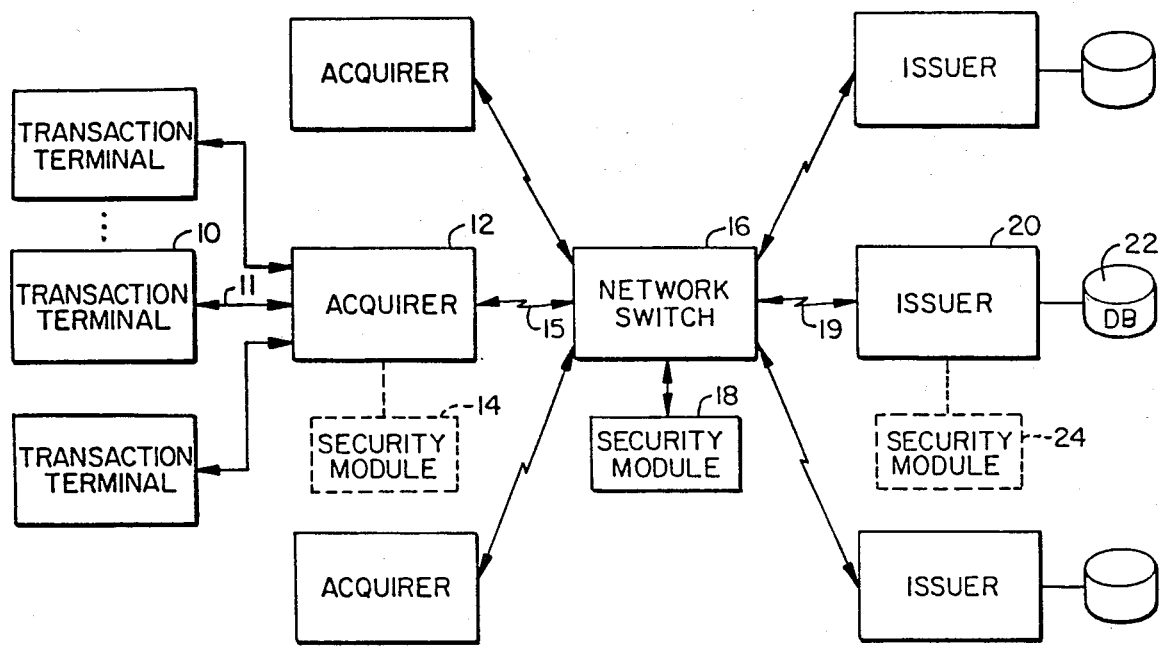
FIG._1.
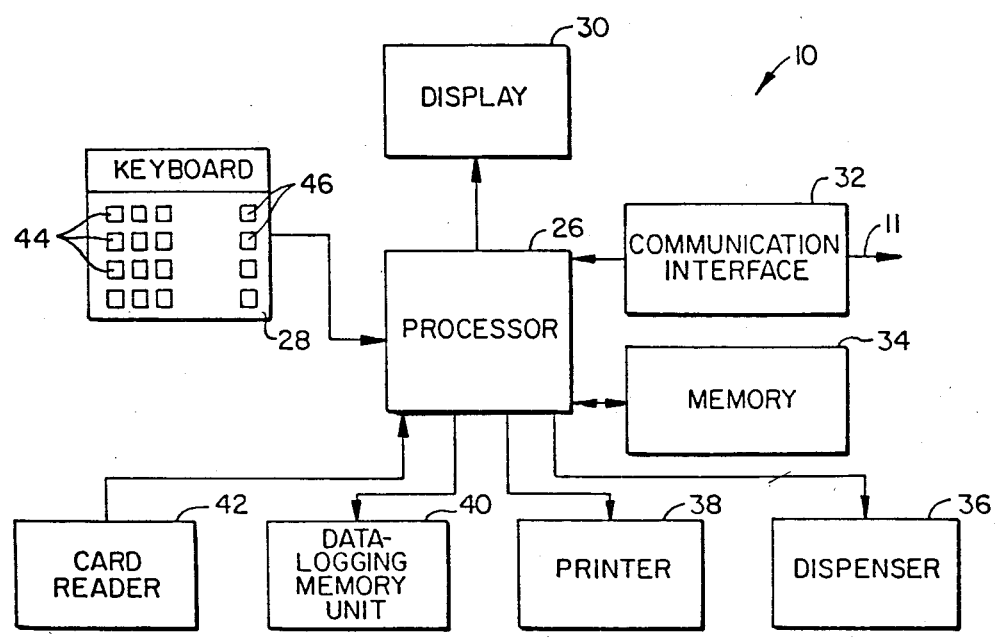
FIG._2.

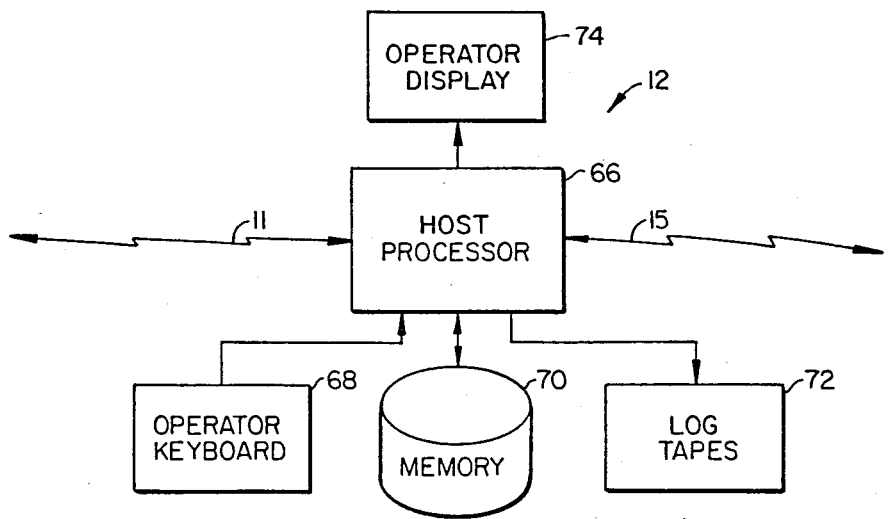
FIG._4.
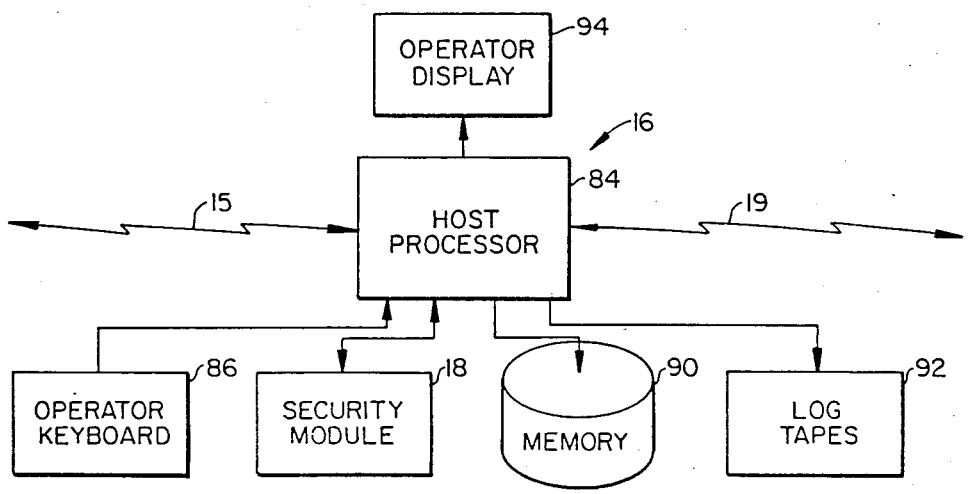
FIG._6.
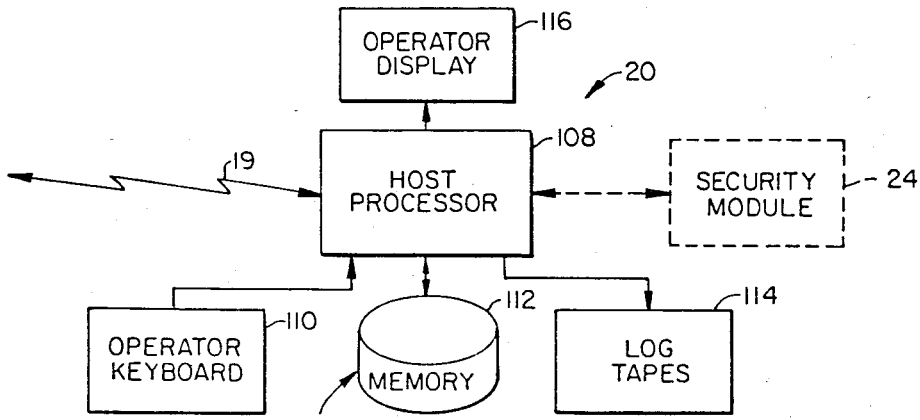
FIG._8. FOR FILES OF CARDHOLDER PINS (ENCRYPTED WITH DATA BASE KEY), FOR BUSINESS-DECISION ACCOUNT INFORMATION, GENERAL DATA, PROGRAMS, ACTIVITY FILES, ETC.

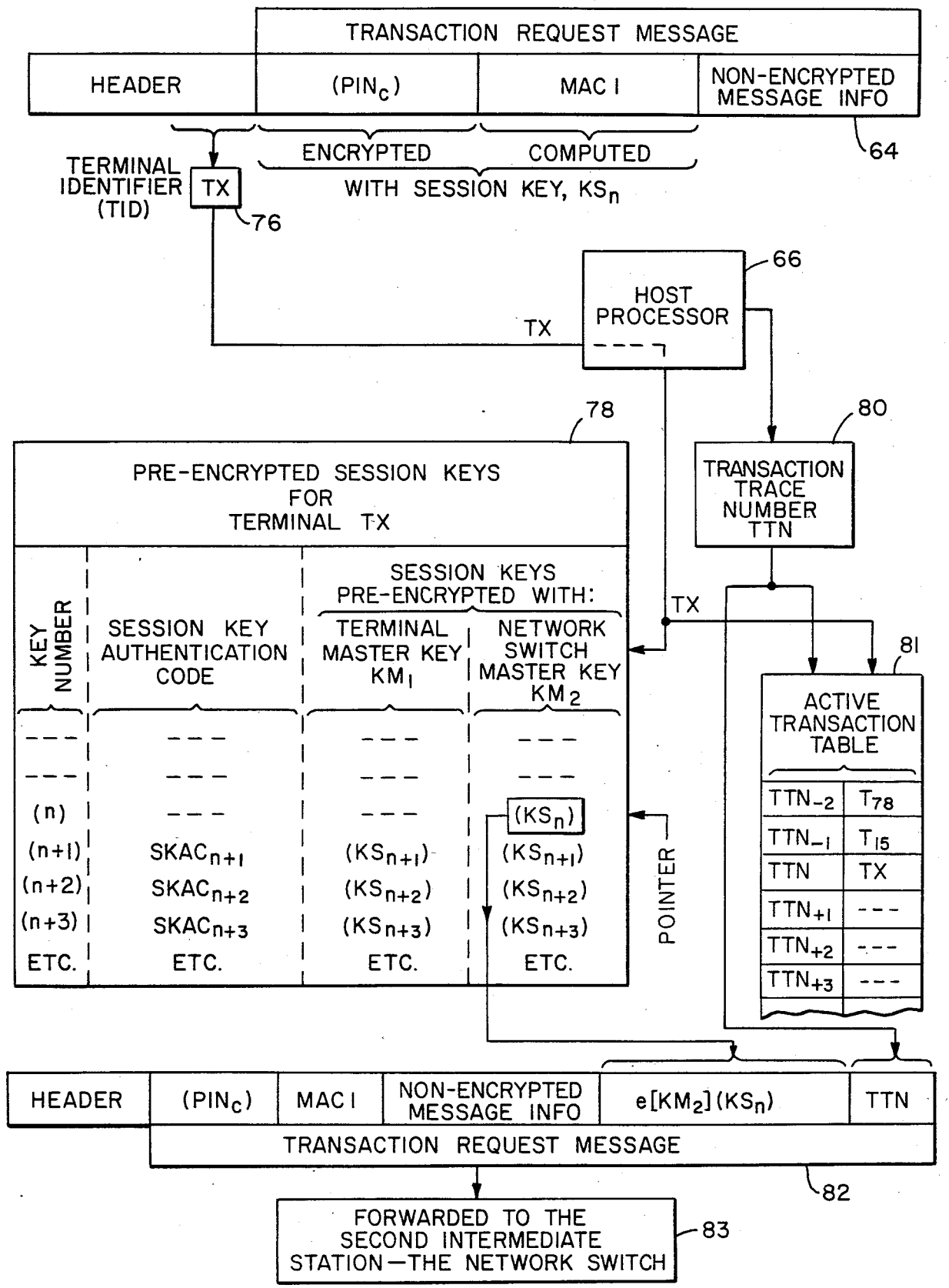
FIG._5

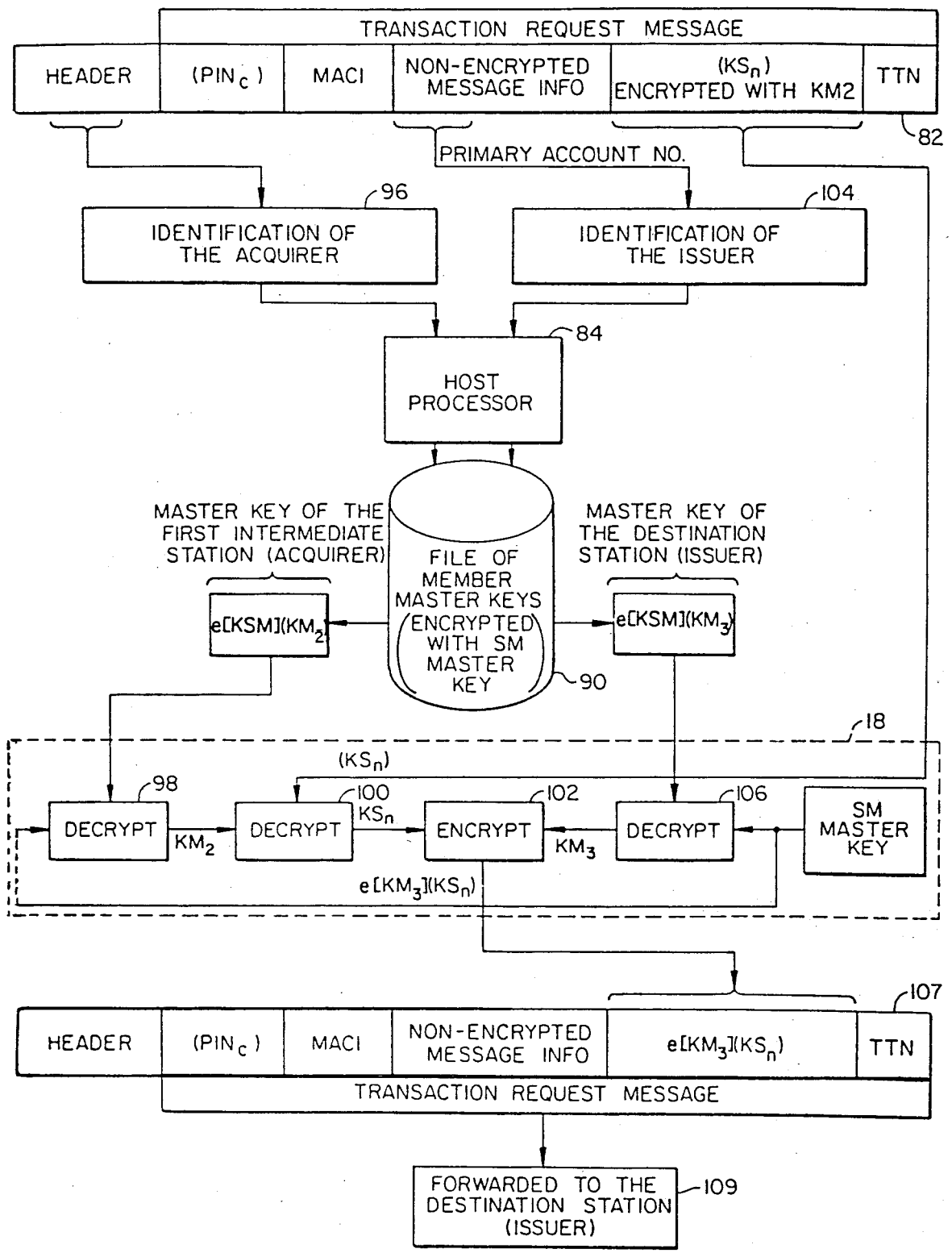
FIG._7.

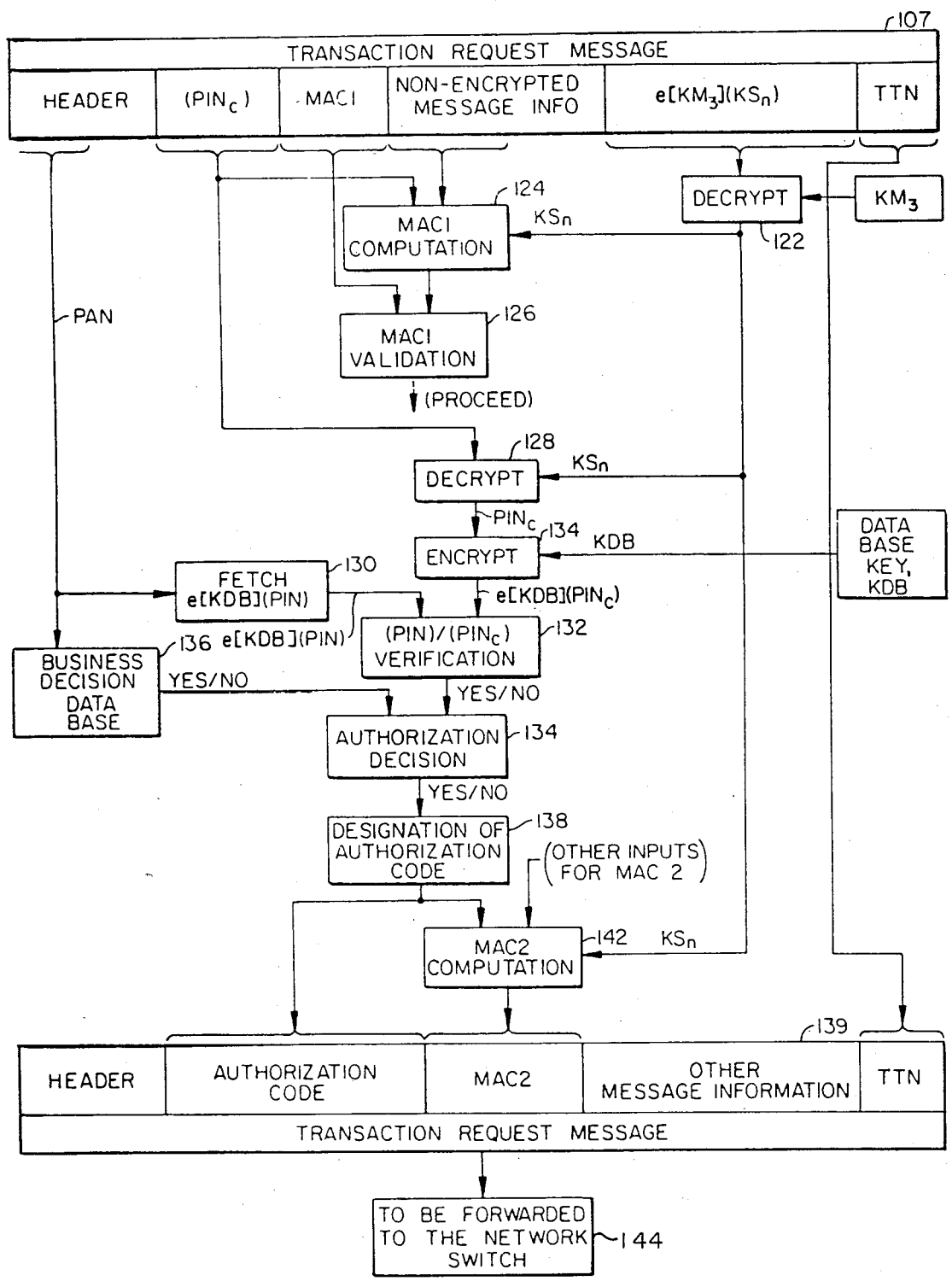
FIG._9.

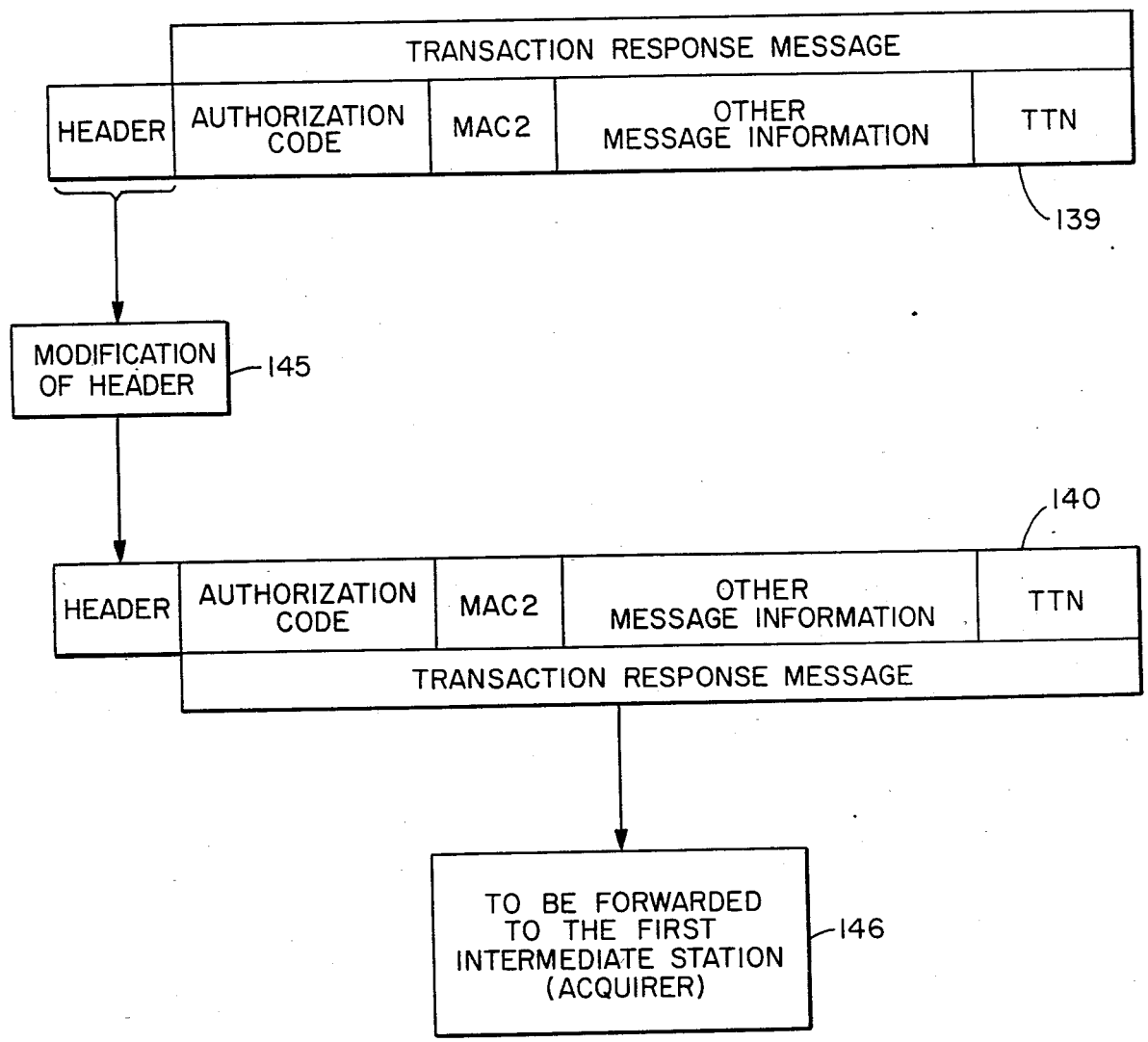
FIG._10

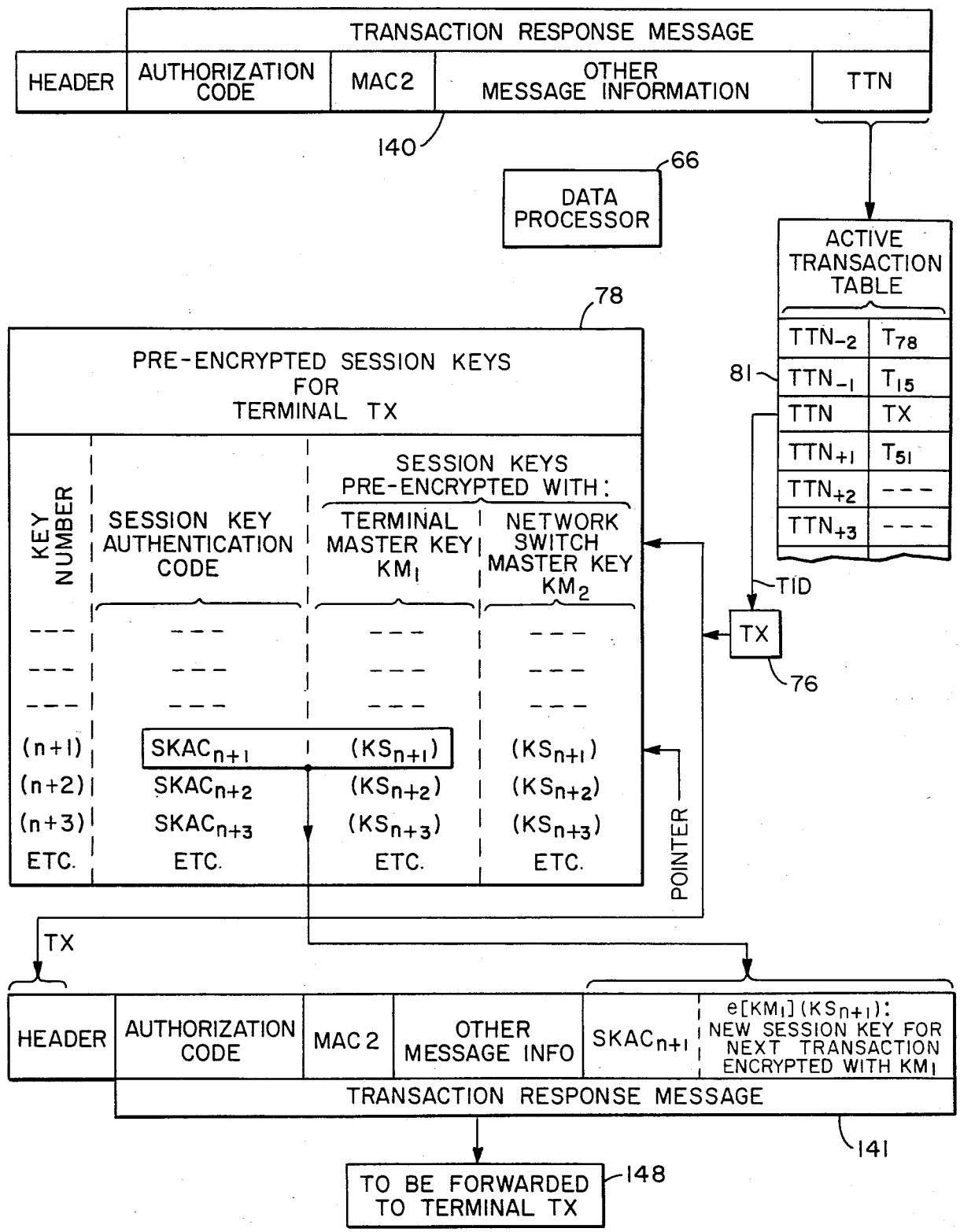
FIG._11

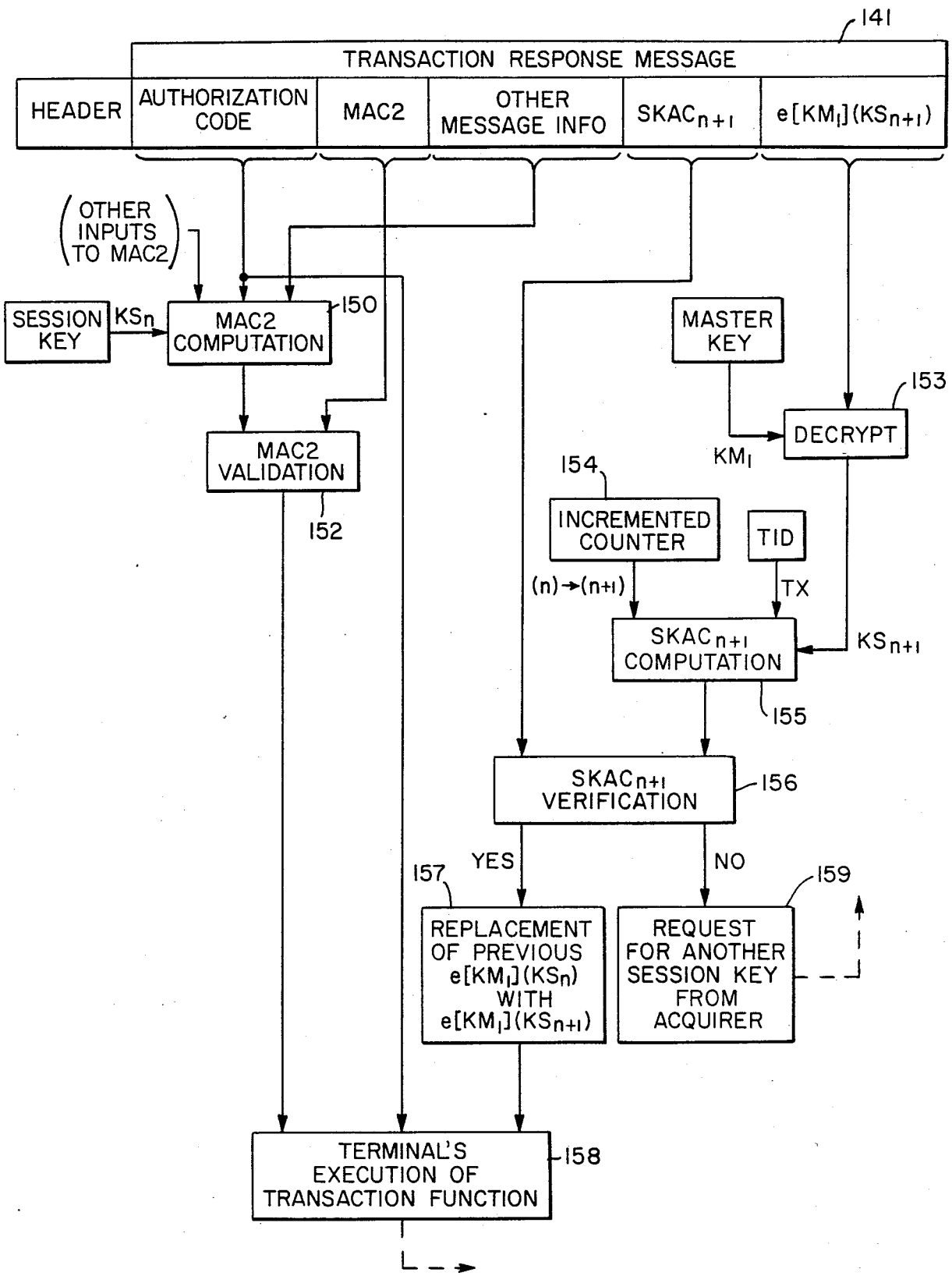
FIG._12

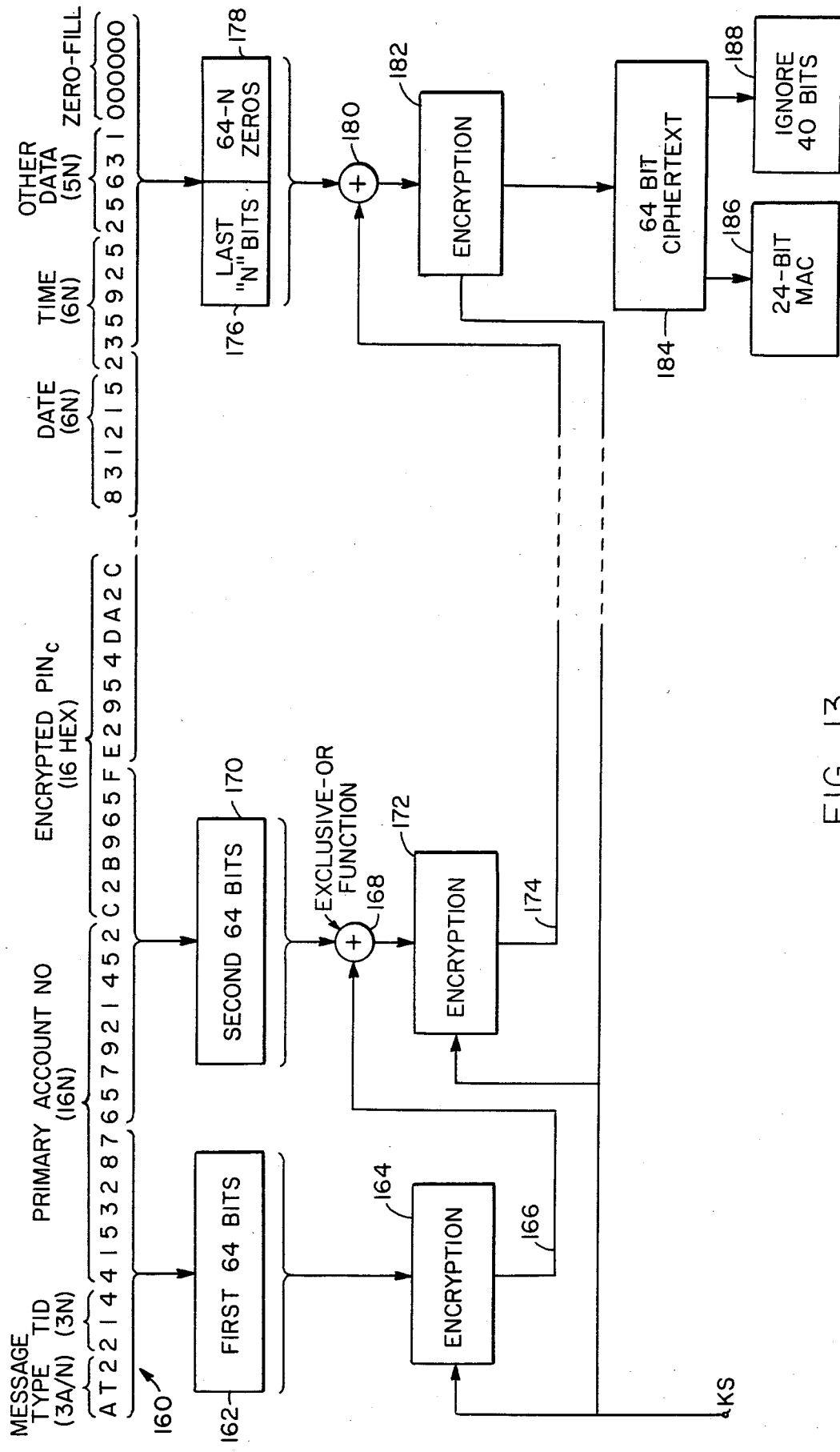
FIG._13

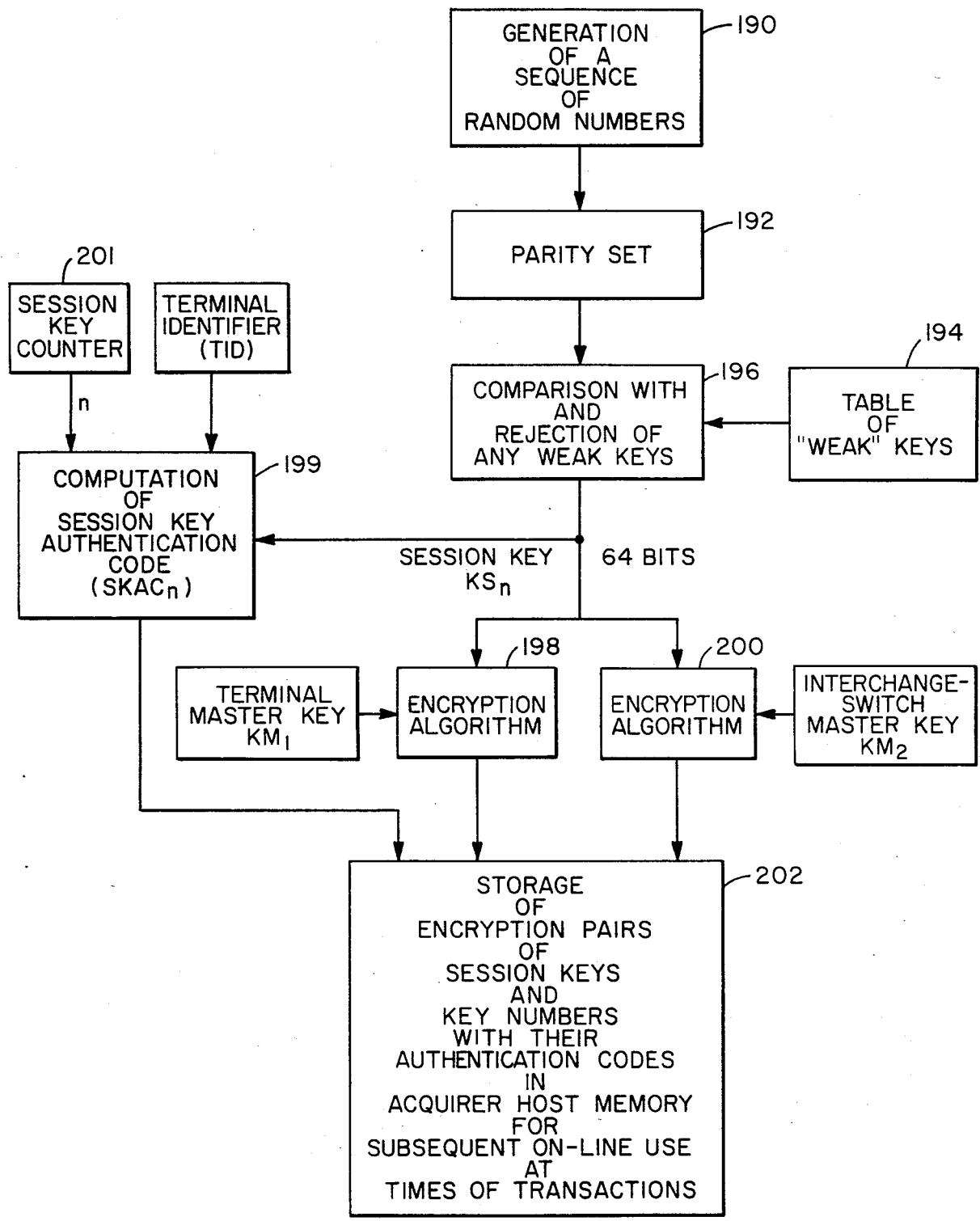
FIG._14

END-TO-END ENCRYPTION SYSTEM AND METHOD OF OPERATION

This Application is a continuation in part of U.S. application Ser. No. 278,001, filed June 24, 1981 and now U.S. Pat. No. 4,423,287, issued Dec. 27, 1983.

BACKGROUND ART

This invention relates to encryption systems and more particularly to an encryption system for use with transaction terminals such as automated teller machines (ATM), cash dispensers (CD), and point of sale (POS) devices. Such machines are typically accessed by means of a card issued by the customer's bank. Within the past twelve years the number of teller machines and cash dispensers has grown from a few scattered units to a worldwide total of almost 50,000 units. In many areas, groups of institutions have begun to cooperate in the establishment of local, regional, and national shared ATM/CD networks in order to extend the customer convenience represented by electronic fund transfer services beyond the local area. In the near future, it is expected that many everyday transactions will be carried out through point of sale devices.

In these systems, a holder of a card issued by one financial institution (the "issuer") can transact business with the issuer through the transaction terminal of a different financial institution (the "acquirer"). This invention applies primarily to this type of transaction where security of one or more message elements must be provided throughout an interchange network communications system, as differentiated from security in a more restricted system not involving many institutions. It is also not limited to financial institutions.

Such networks typically rely on the use of some standardized identifying token which is presented by the user of such services. Such a token would be, for example, a user's plastic card with a magnetizable stripe on the card which is encoded with a particular set of data. It is necessary, however, to provide for the security and privacy of some of the data which is sent by such a user from the transaction terminal through intermediate stations, to the issuer's data processing center. These security provisions must meet needs for economical data transmission, preclude unauthorized access to critical customer related information, and provide a level of privacy that conforms to governmental regulations as they may be formulated. This level of protection must include the entry, transmission, storage, and verification procedures which are used by the various components of the interchange network.

Among the data elements of the transaction terminal message, the most critical requiring some form of protection are:

(a) the cardholder's personal identification number (PIN);
(b) the cardholder's primary account number (PAN);
(c) the cash advance or disbursement amount;
(d) the date and time of the transaction; and
(e) a terminal identifier number (TID).

There are cryptographic techniques in existence which provide the means by which data elements such as these can be protected. Such a technique will be discussed in greater detail hereinafter. However, for the present purpose, it is sufficient to know that in the case of the PIN, for example, protection can be achieved by using a cryptographic process called "encryption" by which a PIN of "9725" might, for example, "be converted temporarily to a disguised value of "B*7@" for transmission from an acquirer through an interchange network to the issuer. In this sense, the word "acquirer" would be the financial institution operating the transaction terminal, while the issuer would be, for example, the destination financial institution providing financial services to the user. At the destination of the message this disguised value would be converted to the original "9725" value by a reverse cryptographic process called "decryption" for further processing to verify the validity of the PIN.

For other critical message elements, such as the amount of the cash advance or disbursement, secrecy may not be required, only protection against alteration. Therefore, instead of encryption, a well-known cryptographic process called "message authentication" is used. This process uses each of the critical data elements in a sequential encryption-like computation that results in a "message authentication code, MAC" to be included, along with the protected data elements, in a message which is transmitted to the destination (intermediate or final).

At the destination, the MAC computation process is repeated on the same data elements. If any one or a combination of these elements has been modified while being transmitted through the interchange network, the resulting MAC would not, with reasonable probability, be identical to the MAC value received, and the message would be rejected because of probable fraud.

For an interchange encryption-decryption process to work, a standard for data protection must be used. In the United States, the American Bankers Association (ABA) Bank Card Standards Committee and the American National Standards Institute (ANSI) have adopted the standard published by the National Bureau of Standards (NBS) of the U.S. Government as the basis for this type of security. A brief description of the NBS concept is presented here for reference. The elements of the concept include an algorithm called the data encryption standard (DES) algorithm and a secret key. The DES is a set of complex mathematical transformations that has been published and is known to everyone, including potential adversaries. The secret key consists of 64-bits of data, known only to the system participants, that make the use of the published algorithm unique and secure.

The DES has the property of "reversibility"; i.e. the DES and the secret key can be used to "encrypt" the input data for protection. They can also be used to "decrypt" or reverse the protected data back to its original form with the same key that was used for the encryption process. A secret 64-bit key establishes security of the encryption system. The input can be any desired 64-bit combination of data. On command, the DES system subjects the input to sixteen complex transformations and presents the 64 resultant "ciphertext" bits at the output register. By ciphertext is meant that the text would be enciphered and not intelligible when reading or computer-based analysis were attempted.

As long as potential adversaries are prevented from learning the key, data for the typical cash advance or disbursement can generally be assumed to be secure. There are no known methods of attacking the system analytically. For a known input/output pair, solving for the key through "exhaustive" sequential testing of all possible (approximately) 72,000,000,000,000,000 values of the key does not appear to be practical within the near future. Use of two or more sequential encryption processes with corresponding different keys would require millions of years of processing by the fastest computers for exhaustive testing, thereby making any such attack completely infeasible.

As described above, a DES key consists of 64 bits which can be interpreted as 16 hexadecimal characters (0–9, and A–F). The security of any system based on DES processing is dependent upon the integrity of key generation and distribution as well as upon the human-related management and operational procedures established for the system. While there are a number of such keys to be used in this type of system, the two types of such keys which have relevance to the present discussion are a data-encryption or session key, and a key-encryption or master key.

A session key is a one-time key only used for the life of one transaction. In some manner, the session key must be sent from the sender to the receiver and the sending of the transaction must convey to the receiver the specific session key which was used for encrypting the transaction. No matter what method for informing the receiver is used, the session key must be protected during the transmittal process by encryption using a master key. Because the session key is used for only one transaction, the potential for compromise is reduced. The key-encryption key, or master key, however, is used for encrypting a session key being transmitted over normal data communication lines or stored in a host data processor. These master keys must be generated, distributed, and loaded under greater security control than that normally used for other types of keys. Because of the high level of security under which these keys are handled, master keys are typically used for longer periods of time that could extend into many months.

In an extensive network, with a large plurality of acquirers and a large plurality of issuers, a switch station ("network switch") is used to route and coordinate the transaction requests and responses between the various acquirers and issuers. In such systems, it is simply not economically feasible to separately send session keys in special network messages. Also, the time requirements would be prohibitive.

The problems facing the operation of such ATM/CD networks are, then, to provide maximum-feasible security for the transaction data by encryption and decryption processes, and to securely, efficiently, and economically store, retrieve, and transmit the keys necessary to perform these processes.

SUMMARY OF THE INVENTION

The foregoing problems of how to operate an interchange transaction execution system of the type having multiplicities of transaction-source terminals and destination (issuer) data processors which store account information for a plurality of accounts, a plurality of acquirer stations each connected to one or more transaction terminals, and at least one network switch connected between the acquirer stations and the issuer stations, are solved by carrying out the steps to be described hereinafter. Transaction information and a personal identification number, PINc, are received from the user at the transaction terminal. A first session key encrypted with a first master key is retrieved from the terminal's memory and is decrypted with the first master key that is also stored in the memory. In the preferred embodiment, the PINc is encrypted with the first session key KS1 and the encrypted PINc and selected elements of the transaction data are concatenated. The concatenated data are processed with the first session key, according to an arbitrarily-specified procedure to form a first message authentication code, MAC1. A network/interchange request message comprised of the encrypted PINc, the MAC1 and other transaction data are transmitted from the transaction terminal to the acquirer station connected to said terminal.

The acquirer financial institution, retransmits the message along with the same session key, but now encrypted in a second master key, to the network switch. The second master key is known to the network switch as the decoding element to use for that particular acquirer. The network switch, after determining for which issuer the request is intended, retransmits the message to that issuer along with the session key which it translates from second master key encryption to a third master key encryption. The third master key is known to the network switch as the coding element to use for that particular issuer.

At the issuer, the session key is decrypted with the third master key, and the PINc is decrypted with the session key. The MAC1 is recomputed and verified with the received MAC1 using the encrypted PINc, the selected data elements, and the session key. The data base within the issuer's data processor is then accessed for the account specified in the transaction data. The PINc is compared and verified with the corresponding PIN stored in the data base for that account.

At the issuer's data processor, after the PINc and the MAC1 have been verified, and the account balance for the user's PAN has been checked for adequacy, an authorization code is generated to either authorize or deny the requested transaction. A second message authentication code, MAC2, using the session key is computed. The authorization code and the MAC2 are then included in the response message transmitted back to the acquirer through the network switch.

As will be explained further herein, at the acquirer, a new second encrypted session key is added to the response message to be relayed to the orginal transaction terminal, i.e., the ATM/CD. In addition, a session key authetication code (SKAC) may also be added to the repaly message. At the terminal, the MAC2 is recomputed and verified using the first session key. Assuming that the MAC2 is properly verified, the transaction terminal acts on the authorization code to respond to the transaction terminal user. As discussed below, if the system is operating with session key authentication codes, the SKAC will also be computed and verified.

In the preferred embodiment of the invention the acquirer peiodically generates and stores a plurality of session keys in encrypted pairs, the key of each pair being encrypted in a first master key and also in a second master key. With each return message from the host data processor, a new, or second session key, encrypted in the first master key, is appeneed to the return message. At the transaction terminal, the second encrypted session key, at the conclusion of the transaction, replaces the first session key and is stored for use with the next transaction. As discussed below, if the session key is to be authenticated, a SKAC will be generated for each encryption pair of a keys.

For each transaction request message received from the terminal, the acquirer relays a modified message to the network switch. By keeping track of the identifying number of the terminal, the acquirer is also able to recover from storage the second master key encryption of the same session key used to encrypt the PINc at the transaction terminal. It then transmits this latter key, i.e., the session key which is encrypted in the second master key to the network switch, as described above.

One of the significant advantages of an end-to-end encryption system, as opposed to other types of encryption, is that the one time session keys guarantee that all encrypted data and MACs will be different even for identical transactions. Therefore, data-substitution, PIN substitution, and message-replay types of adversary attacks are precluded. Also, potentially more security is offered against statistical analysis types of attack. A primary advantage of the present end-to-end encryption system is the ease and economy with which these session keys are securely and efficiently distributed. No special key-request or key-transmission messages are required. Another significant advantage is that the system also eliminates the requirements for encryption and re-encryption of critical data, and recomputation of MACs at all intermediate nodes. Therefore, the potential vulnerability to in-house sophisticated attacks is lessened, the messageprocessing and computer-time requirements are minimized, and the requirement for any on-line security processing at the acquirer installation is eliminated, thereby precluding the need for a special "Security-Module" peripheral at the acquirer.

In other, less desirable embodiments the MAC feature can be omitted, however the level of security for the transaction diminishes accordingly.

In the areas of efficiency and growth, in the subject system, only one security module access is required per transaction as opposed to five with a link-encryption system. By security module access is meant access into a secured, hardware/software unit in which encryption and/or decryption processing can be securely executed. Any such access requires significant amounts of processor and host to security module communication time. In the subject end-to-end system, approximately only 15 real time encryption and/or decryption cycles are required per transaction, as opposed to approximately 56 for a link-encryption type of system. The relative efficiency of end-to-end systems increases substantially for operations requiring double-key encryption for maximum security.

As pointed out above, one of the advantages of the subject invention is that no security module access is necessary at the acquirer when retransmitting the message to the network switch. Rather, all cryptographic security functions can be done in an off-line, batch manner with most of the encrypted keys being stored on a disc. Groups of encrypted keys can be accessed from the disks periodically, as needed.

The decision as to whether the issuer utilizes a security module is typically left to the issuer. However, if the issuer does not use a security module, there exists a remote possibility that the system could be compromised. This method of attack relates to the replay of session keys as discussed below. The present invention is intended to prevent this mode of attack.

The message replay type of attack requires a passive tap hooked into the processor located at the issuer. In addition, an active tap would have to be installed between the automatic teller machine and the acquirer station.

The attack sequence would then be carried out in the following manner. A reply message from the acquirer to the ATM would be recorded in order to obtain the encrypted session key which is appended to the message. The following transaction initiated at the terminal will be encrypted using the session key which had just been recorded. When the latter transaction information reaches the issuer, the passive tap would then be utilized to detect the session key while it was in clear text form in the processor. This information would then be relayed to the active tap.

During a subsequent transmission of a reply from the acquirer to the terminal, the active tap would strip off the new encrypted session key which had been appended to the reply by the acquirer. The active tap will replace the legitimate encrypted key with the stolen, known encrypted session key. The criminal will then initiate a request for cash at the ATM. This request will be encrypted under the known session key. Accordingly, the active tap can intercept the response to this request and construct a suitable approval reply message, utilizing the known session key. This scenario could then be continuously replayed until the cash in the teller machine was emptied with cash.

As can be appreciated, the above attack scenario is relatively complex, requires a number of players and the timing must be accurately coordinated. However, it would be desirable to eliminate any possible modes of attack in an encryption system. One method of obviating this form of attack is to require the issuer to utilize a security module. By this arrangement, access to the session keys in clear text form is prevented. However, as in most fund transfer systems, it is desirable to permit each bank to have control over its own level of security. Furthermore, each bank should not have to rely on remote banks to supply security. Accordingly, it would be desirable to develop a system which would prevent the above discussed mode of attack and yet not require issuer cooperation. The latter object is solved in accordance with the new disclosure contained in the subject application.

Briefly, this attack scenario is prevented by insuring that a session key can never be used more than once. Session key uniqueness is guaranteed utilizing a session key authentication code. A session key authentication code SKAC is generated for each encryption pair of a session keys at the acquirer station. The SKAC is generated in a manner similar to a MAC, except that different inputs are used.

In use, when the acquirer station relays a message from the issuer, not only is a new session key appended to the message but, in addition, the SKAC is added. Prior to dispensing cash, the terminal will recompute and verify the SKAC to determine if a new and unique session key has been transmitted. If the SKAC is verified, the transaction will be completed and the new key will be used to replace the old key. If the SKAC is not verified, the terminal will request a new session key from the acquirer. If a properly authorized new session key is not received, the terminal will not complete the transaction.

Applicant's copending parent application can be referred to for a full disclosure of the preferred implementation of an end-to-end encryption system which does not utilize session key authentication codes. The remainder of this specification will be limited to an embodiment where session key authentication codes are utilized.

It is therefore the object of the present invention to provide a method of operating a transaction execution system which allows for the efficient and economical management of system keys and transmission of critical data elements in encrypted form, from one of many transaction terminals to a selected one of many destination data processors, which data are not, at any intermediate station, decrypted to clear text.

It is still another object of the invention to provide a method and apparatus for operating a transaction execution system which allows a network to be easily formed and expanded.

It is a further object of the subject invention to provide a method and apparatus for operating a transaction execution system which insures that a unique session key is utilized for each transaction, thereby preventing attack by message replay, substitution and the like.

The foregoing and other objectives, features and advantages of the present invention will be more readily understood upon consideration of the following detailed description of certain preferred embodiments of the invention, taken in conjunction with the accompanying drawings.

BRIEF DESCRIPTION OF THE DRAWINGS

FIG. 1 is a block diagram representation of a transaction execution network in accordance with the invention;

FIG. 2 is a block diagram representation of a transaction terminal used in the transaction execution network shown in FIG. 1;

FIG. 4 is a block diagram of the acquirer station used in the transaction execution network shown in FIG. 1;

FIG. 5 is an operational block diagram representation of the manner in which a transaction request forwarded by the transaction terminal is received by the acquirer station and is passed on to a network switch station;

FIG. 6 is a block diagram of a network switch station used in the transaction execution network shown in FIG. 1;

FIG. 7 is an operational block diagram representation of the manner in which a transaction request is received by the network switch station from the acquirer station and is forwarded to an issuer station;

FIG. 8 is a block diagram of the issuer station used in the transaction execution network shown in FIG. 1;

FIG. 9 is an operational block diagram representation of the manner in which a transaction request, forwarded by the network switch is received by the issuer, is processed, and a reply message is generated;

FIG. 10 is an operational block diagram representation of the manner in which the network switch relays the reply message to the acquirer station;

FIG. 11 is an operational block diagram representation of the manner in which the issuer's reply message is processed by the acquirer station and is relayed to the original transaction terminal;

FIG. 12 is an operational block diagram representation of the manner in which a transaction reply message from the issuer; related by the network switch and the acquirer, is processed by the original transaction terminal;

FIG. 13 is an operational flow chart illustrating the computation of a message authentication code, MAC; and FIG. 14 is an operational block diagram illustrating how the acquirer station depicted in FIG. 4 batch generates session key encryption pairs for subsequent on-line use.

BEST MODE FOR CARRYING OUT THE INVENTION

Figure 3:
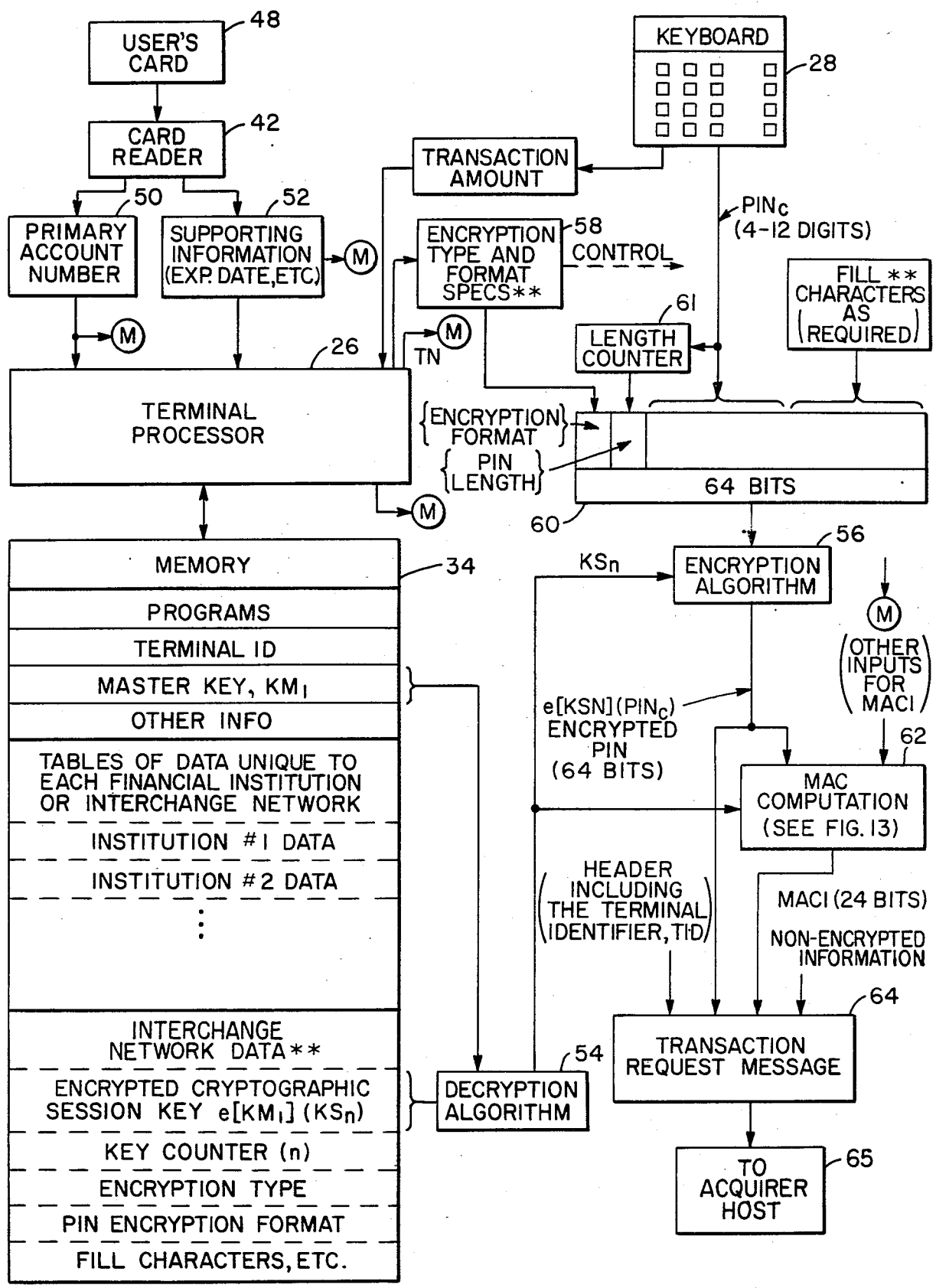
FIG. 3 is an operational block diagram representation of the manner in which a user initiated transaction request is initially processed by the transaction terminal.

Referring to FIG. 1, the transaction execution system of the invention includes a plurality of acquirer stations 12, each of which has a plurality of separate transaction terminals 10 associated with it. The acquirer stations 12 can be placed in communication with a particular issuer 20, e.g. the transaction terminal user's financial institution, through a network switch station 16.

In operation, a transaction terminal 10, which may be an automatic teller machine (ATM), cash dispensing (CD) machine or point of sale (POS) terminal, receives transaction information from a user in the form of a personal identification number PINc, an amount, a primary account number PAN, a service code, etc. which can be input by means of a combination of magnetic stripes on a plastic card and a keyboard. The transaction terminal 10 identifies the PAN as having been issued by a potential interchange-type issuer, then retrieves a session key from its electronic memory, which key has been encrypted in a first master key. The session key is decrypted using the first master key, and the personal identification number PINc is encrypted using the session key and the data encryption standard algorithm heretofore discussed. This encryption/decryption process is described in further detail in "Data Encryption Standard, Federal Information Processing Standards Publication, January 15, 1977, FIPS PUB 46" which is incorporated herein by reference. While this encryption/decryption algorithm is preferred, in other embodiments other such algorithms having the same properties could be used.

The transaction terminal 10 then computes a first message authentication code MAC1 on critical data using the session key. Only certain data elements, such as the PINc, need be kept secret by encryption during the transmission of a message from the transaction terminal through the interchange network to the issuer. Other elements, such as the transaction amount, can generally be left in clear text form for possible processing or logging at intermediate nodes of the network. These clear text message elements may be protected through inclusion in a message authentication code MAC.

A MAC, in the present invention, is computed at the point of message origination by a process to be described in greater detail hereinafter in reference to FIG. 13.

For the present purpose it is necessary only to note that the inputs to the MAC computation are generated by concatenating all critical data elements for which MAC protection is required. Using the DES with a session key, the concatenated data is input, eight bytes (64-bits) at a time into a sequence of MAC computation cycles. The final DES ciphertext output is truncated to a standard length, in this example three bytes. This value constitutes the MAC, the shortened length being used to minimize the message length without undue sacrifice in security.

The MAC is included in the message for transmission to the destination where it is recomputed with the same session key and input data elements. If the two MAC values are equal, there is virtually no possibility that any of these data elements could have been changed, thereby providing the desired message authentication. In the event that the two values are not equal, the integrity of the message is suspect and the message initiator will be so notified to enable it to initiate prespecified procedures. Such procedures would typically include regeneration and retransmission of the message. Multiple MAC-check failures lead to some designated form of action, such as refusing to accept any further transactions for that PIN or PAN.

The transaction terminal 10 sends to an associated acquirer station 12 a message comprised of the encrypted PINc, the MAC1 and other transaction data. In some embodiments the transaction terminals are actually operated under a controller tied to the acquirer 12, in which the data is relayed by the controller to the acquirer host processor.

This transaction data would typically include the primary account number PAN, the date, the time, the terminal identification number of the transaction terminal 10, as well as other miscellaneous information.

The data are received at the acquirer station 12 connected to that particular transaction terminal. The station 12 would typically be either in the headquarters or branch of the financial institution which controls the transaction terminal 10. A security module 14 may be associated with the acquirer station 12. A security module would be a secured facility within the station to which unauthorized physical and electronic accesses are precluded as far as is feasible. Within the security module 14, a plurality of encryption pairs of master key encrypted session keys are batch-generated. The session key of each encryption pair is encrypted in a first master key, and is also encrypted in a second master key. In the present embodiment, a session key authentication code (SKAC) is computed for each session key. The plurality of encrypted pairs of session keys, i.e., $e[KM_1](KS_1, KS_2, KS_3 \ldots KS_n)$, $e[KM_2](KS_2, KS_2, KS_3 \ldots KS_n)$ and the associated SKAC's ($SKAC_1$, $SKAC_2$, $SKAC_3 \ldots SKAC_n$) are then output for storage in a memory within the acquirer host processor.

In the preferred embodiment, the security module 14 is omitted and the session keys and associated SKACs are simply generated, encrypted, and stored by the host processor in off hours under special security precautions.

When the acquirer 12 receives the transmission from the transaction terminal 10, it identifies the transaction terminal that initiated the inquiry which enables it to access from its host memory the second master key encrypted session key, $e[KM_2](KS_n)$ which is paired with the first master key encrypted session key, $e[KM_1](KS_n)$, used by the transaction terminal 10 to encrypt the PINc and to compute the MAC1. The message comprised of the encrypted PINc, the MAC1 and other transaction data is relayed on to a network switch station 16 via data communication lines 15. Appended to that transmission is the recovered, second master key encrypted session key, $e[KM_2](KS_n)$.

The network switch 16 processes transactions between a plurality of acquirers and a plurality of issuers. In some systems, it may also provide communications between two networks, in which case it would interface with the network switch of the second system. Such network switches could be located to be geographically convenient to the acquirers and issuers which make up the network.

The network switch 16 has a security module 18 associated with it. The network switch identifies the sending or acquirer financial institution station 12, locates the security-module encrypted second master key for that bank, determines which issuer 20 the message is intended for from the primary account number, and locates the appropriate security-module encrypted third master key for that issuer. The security module 18 decrypts the master keys, then decrypts the session key with the second master key and reencrypts it in the third master key. The network switch station 16 retransmits the message including the third master key encrypted session key, $e[KM_3](KS_n)$, to the designated issuer 20 via data communication lines 19.

The issuer 20 includes a host data processor and data base 22. It may also have a security module 24. As discussed above, when utilizing session key authentication codes, the acquirer station is protected even if the issuer does not utilize a security module. However, the issuer may desire to use a security module to protect its own accounts.

The issuer 20 receives the encrypted message from the network switch station 16. The issuer then decrypts the session key using a third master key and also decrypts the PINc using the now decrypted session key. Furthermore, using the session key, the issuer recomputes the MAC1 and verfies it. With the PAN, that is the primary account number, the issuer retrieves the PIN associated with that PAN from the data base 22. This PIN is typically encrypted in a data base key. The user-entered PINc is then encrypted in the data base key also, and the two are compared for verification of the user-entered PINc.

The issuer 20 then specifies an authorization code, such as "authorize" or "deny" (the transaction), and generates a return message. A second message authentication code MAC2 is computed using the session key. This return message including the MAC2 travels back through the network switch 16 and the acquirer 12 to the transaction terminal 10.

The network switch station 16 does nothing but pass on the return message plus the MAC2 to the acquirer 12. The acquirer 12 receives the return message including the MAC2, identifies the initiating transaction terminal 10 and retrieves the next session key, encrypted in the first master key, and appends it along with the associated SKAC to the response message for use in the next transaction by that particular terminal. The entire message is then forwarded to the transaction terminal 10.

The transaction terminal 10 receives the response to the initial request, including the MAC2 and the new, first master key encrypted session key. It recomputes and verifies the MAC2 using the original session key. It also determines that the newly supplied first master key encrypted session key is a unique key never previously used by recomputing and verifying the SKAC. The inputs and processing of the SKAC are explained in further detail in a subsequent section of this application.

If verification is successful, the terminal will interpret the authorization code for a decision on approving or declining the cash advance or disbursement request by the user and take the appropriate action. Finally, the old session key is discarded and replaced with the new first master key encrypted session key in electronic storage.

It should be mentioned at this point that master keys are typically generated under multiple control. Each security officer does not know the other officer's input(s), and a single master key is typically generated only in secure hardware by an Exclusive-OR logical process which is well-known to those skilled in the data processing art.

Referring now more particularly to FIGS. 2 and 3 the transaction terminal 10 will be discussed in greater detail, and in particular, how it operates to process a received request.

The transaction terminal 10 can take a variety of forms. Since such terminals are commercially available and are well understood by those skilled in the art, a detailed explanation will not be given. For an example of one such terminal see U.S. Pat. No. 3,956,615.

At the heart of the transaction terminal is a micro- or miniprocessor 26 with a number of peripherals. Among these peripherals are a keyboard 28, a display 30, a communications interface module 32, a memory 34, a dispenser 36, a printer 38, a data logging memory unit 40, and a card reader 42. All of these peripherals either supply inputs to the processor 26 or carry out operations under its control.

The keyboard 28 has a plurality of entry switch keys 44 and a plurality of function keys 46. The keys 44 allow a transaction terminal user to enter the user's personal identification number (PINc), the amount, etc. The function keys 46 allow the transaction terminal user to designate the type of function, that is "withdraw from checking", "cancel", "enter", etc.

Display 30 can be in the form of a cathode ray tube display, a light emitting diode display or a liquid crystal display, for example. The display gives prompts to the transaction terminal user and also displays other general information and instructions under the control of the processor 26. The communication interface 32 connects the processor to the acquirer 12 through data communication lines 11. Where a direct link is maintained between the transaction terminal 10 and the acquirer 12, this communication interface would be relatively simple; however, where the terminal is remote from the acquirer, and the connection is made over certain types of normal data communication lines, the interface 32 would include a MODEM.

The memory 34 includes solid state or core memory which stores information supplied from the processor 26 and also supplies data to it. The memory 34 also stores the instructional programs for the processor 26, the encryption keys, and other information required for processing to carry out the functions of the transaction terminal 10. Programmable Read Only Memory (PROM) is typically used for these latter functions.

The dispenser 36 dispenses cash, travellers checks, etc., under the control of the processor 26. The printer 38 prints receipts, audit information, etc., under processor control 26.

The data logging memory unit 40 includes either a tape or a diskette and basically records the transaction information of the transaction terminal 10. This data is used for the bank's record keeping functions.

The card reader 42 detects encoded data on the transaction terminal user's card. These data are typically magnetically or optically encoded, however, in future, more sophisticated embodiments the card reader may interface with so-called "smart cards" which actually incorporate microprocessors of their own.

Referring now more particularly to FIG. 3, the operation of the transaction terminal will be explained. The user's card 48 is entered in the card reader 42 where the primary account number (PAN) and the supporting information such as the expiration date, etc. are read from the card by the card reader 42 at steps 50 and 52 and are entered into the processor 26. From the first several digits of the PAN (or other institution designator), the processor 26 determines whether the transaction to take place is with reference to the acquirer institution, with some other local institution with which the acquirer has a local arrangement, or with an interchange network. The processor 26 first searches its tables in memory 34 to determine whether the PAN corresponds to a first institution, a second institution or a plurality of other institutions with which it has local arrangements and, if it cannot find a match between any of these institutions and the first several digits of the PAN, the processor 26 then concludes that this might possibly be an interchange transaction. It then checks a more restricted set of digits, e.g., the first digit, which could be, in the case of a particular interchange network, a 4. If it gets a match with that 4, regardless of what all of the other digits are, the processor 26 concludes that this is potentially an interchange transaction.

It then goes into that portion of the memory 34 dealing with interchange network data. This data includes a unique encrypted cryptographic key, which corresponds to the session key, described above, encryption type information, PIN encryption format data, and fill characters. From another location in memory 34, the processor 26 withdraws the master key KM and, by means of the decryption algorithm 54, it decrypts the encrypted session key to produce the interchange session key $KS_n$. The session key has been designated generally here for the purposes of this discussion and it should be apparent that n=any integer. $KS_n$ is supplied to the key input of an encryption (DES) algorithm 56. It should be noted that, while process steps 54 and 56 are described as algorithms, they are shown in the diagram in block form to indicate that these procedures may be carried out by means of software programming in the processor 26. In other embodiments, the DES cycles can be implemented on a discrete, integrated circuit chip.

Processor 26 also supplies the encryption type and format specifications 58 to control the formatting of the data 60 which is to be encrypted by the session key KS by means of the encryption algorithm 56. Other data entering block 60 are the personal identification number PINc from the keyboard 28, which may typically be four to twelve digits, and the PIN length derived from a length counter 61 which counts the number of PIN digits. In all, the block 60 includes 64 bits of data and it may include fill characters as required, depending on the length of the PIN, and upon the interchange network's specifications.

This 64-bit block of data 60 is then supplied to the DES encryption algorithm 56 where it is encrypted by means of the session key $KS_n$. For the purpose of this discussion, the encrypted data will simply be referred to as the encrypted PIN, $e[KS_n](PINc)$. The $e[KS_n](PINc)$ is supplied to a MAC computation program 62 which will be described in greater detail in reference to FIG. 13. Also supplied to the MAC computation block is the session key $KS_n$, the PAN from step 50, the supporting information from step 52, the terminal identifier number, TID, and other data such as the date, time, etc., of the transaction. The output of the MAC computation block 62 is a message authentication code MAC1 which is typically 24 bits in length.

The processor 26 forms a transaction request message 64 including a header, which includes the terminal identifier, TID, the $e[KS_n](PINc)$, and the MAC1 plus other nonencrypted information. This transaction request message 64 is passed through the communication interface 32 and is transmitted at step 65 to the acquirer 12.

Referring now more particularly to FIGS. 4 and 5, the acquirer station 12 is illustrated as comprising a host processor 66, which could include a full-sized computer, with the usual peripherals of an operator keyboard 68, or other means of data entry, a memory 70, tape machines 72 and an operator display 74. The keyboard 68 allows for system control and for data entry by an operator. The memory 70 stores the preencrypted session keys as briefly described above, as well as activity files, general data and instruction programs, etc. The log tapes 72 store record keeping data of the transactions processed by the processor 66. The operator display presents general information to the operator and shows special problem alerts.

In operation, the transaction request message 64 is received over the data transmission lines 11 from the transaction terminal by the host processor 66 of the acquirer station. The terminal identifier, TID, is extracted by the processor from the header of the request message 64 at step 76 and is identified as, for example, terminal TX. This identifier TX is supplied to the host processor 66 which uses it to search through table 78 in the memory 70, for keys associated with that terminal. The next key in line in that table will represent the active session key encrypted in the second master key, that is $e[KM_2](KS_n)$. This encrypted session key was previously generated along with $e[KM_1](KS_n)$, was stored in memory, and was indexed as the specific second master key encrypted form of the same session key $KS_n$ that was transmitted with the previous reply message in encrypted form $e[KM_1](KS_n)$ to the particular transaction terminal identified as TX with the previous response message. Corresponding sets of preencrypted session keys would be stored in similar sections of table 78 for other terminals operated by the acquirer.

The $e[KM_2](KS_n)$ is now appended to the transaction request message 64 along with a transaction trace number, TTN, which is generated by the host processor 66 at step 80. This extended transaction request message 82 is then forwarded to the network switch via the data communication lines 15 at step 83.

The transaction trace number TTN is also supplied, along with the TX, to the active transaction table 81 in memory 70 where the transaction trace number and the terminal identification number are stored in pairs. This allows the data processor 66 to properly identify the transaction versus the terminal when the reply message is received from the issuer and the network switch.

For greater security, the preferred embodiment provides a unique master key $KM_1$ for each terminal for the first master key encryption of the session keys in table 78 of FIG. 5. If the acquirer were to use the same first master key $KM_1$ in all supported terminals, a compromise of that one key would potentially compromise all transactions originating from all such terminals. Note that one key in each of the paired encryptions (all second master encrypted session keys) are encrypted with only a single second master key associated with the acquirer station.

Before continuing on to the description of the network switch and FIGS. 6 and 7, it should be noted that the acquirer station 12 would generally also be an issuer station and, therefore, dual functions are possible with all of the elements described above as will become more apparent with the description of the operation of the issuer.

Referring now more particularly to FIG. 6, the network switch 16 comprises a host data processor 84 together with its peripheral equipment comprised of an operator keyboard 86, a security module 18, a memory 90, log tapes 92, and an operator display 94. The operator keyboard 86, the log tapes 92, and the operator display 94 serve the same types of functions as the corresponding elements at the acquirer station, that is, they allow data entry and monitoring as well as record keeping functions to be performed by a resident operator. The memory 90 includes the encrypted master keys of the other network nodes, activity files, general data, programs, etc. For example, it would include the encrypted master keys for a plurality of acquirers which can be expected to address the network switch as well as the encrypted master keys for a plurality of issuers and possibly for a plurality of switches of other networks with which interchange is conducted. Thus, as mentioned above, each acquirer does not have access to the keys of other issuers, but has only its own cryptographic key for addressing the network switch. A major purpose of the security module 18 is for encryption-translation of the session keys, for example from $KM_2$ to $KM_3$, as will be explained in greater detail in reference to FIG. 7.

The placement of the various encrypted master keys, in memory 90, saves on storage space in the security module. In switches which carry very high volumes of data, it may be desirable to provide extra storage area in the security module to hold these keys in plain text form. In this manner, the time necessary to retrieve these keys from outside storage, and to decrypt them, is eliminated.

Referring now more particularly to FIG. 7, the extended transaction request message 82 is received over the data communication line 15 and is broken down into its constituent parts by the processor 84. From the header, the host data processor 84 identifies the acquirer 12 in step 96 and then addresses its memory unit 90 which contains a file of the master keys of the members of the network. These are all encrypted with a special security module master key, KSM. As pointed out above, in some situations, it may be preferable to store the master keys in the security module.

If the master keys are stored in the host memory, the security module encrypted master key for the particular acquirer station $e[KSM](KM_2)$ is transferred into the security module portion 18 and is decrypted at step 98 using the security module master key. The $e[KM_2](KS_n)$ taken from the extended transaction request message 82 is fed into the security module 18 and is supplied to a second DES decrypt step 100, with the decryption key being the now decrypted second master key $KM_2$ from the decryption cycle 98. The output of step 100 is the session key $KS_n$. $KS_n$ is supplied from step 100 to still another DES encryption cycle 102 within the security module 18.

From the nonencrypted message information of the extended transaction request message 82, the host processor 84 extracts the PAN and, at step 104, identifies the destination station of the transaction request message, i. e. the particular issuer for the transaction user. This issuer identification number enables the host processor 84 to select from its memory file 90 the appropriate security module encrypted master key for that particular issuer, $e[KSM](KM_3)$. This key is then decrypted at step 106 and the resulting third master key is supplied as the encryption key for the encryption cycle 102. The output of the encryption cycle 102, $e[KM](KS_n)$ is now substituted in the extended transaction request message for e[KM$_2$](KS$_n$) to formulate a new extended transaction request message 107. The message 107 is forwarded to the destination station, that is the issuer 20 along data communication lines 19 at step 109.

Referring now more particularly to FIG. 8, the issuer 20 comprises a host data processor 108 connected to associated peripheral equipment such as an operator keyboard 110, a memory 112, log tapes 114, an operator display 116, and, in preferable embodiments, a security module 24. Together, the processor 108 and memory 112 make up the processor and data base 22 shown in FIG. 1. The operator keyboard 110, the display 116, and the tapes 114 perform the same types of functions as the corresponding equipment described above in reference to the acquirer station. The memory 112 holds data for the files of each cardholder PIN, encrypted with a data base key, for business decision account information, general data, run programs, activity files, etc. As mentioned above, the issuer station 20 typically would also be an acquirer station as well and, thus, the construction is generally the same as that shown in FIG. 4.

Referring now more particularly to Fiqure 9, the operation of the issuer station 20 will be described as it processes a transaction request and generates a response message.

As was noted above, for the issuer's benefit, it is preferred that all cryptoprocessing be carried out in a security module 24. In the illustrated embodiment, any compromise of the issuer system would not adversely involve any other institution's customers—only his own. The issuer may therefore decide that through exercise of proper physical and operational security, he can safely use his host processor for all cryptographic functions. Therefore, in order to minimize complexity of FIG. 9, no specific security-module functional processing area has been designated, as was necessarily done for the network switch in FIG. 7. As discussed above, system security is assured by utilizing session key authentication.

The third master key KM is supplied from a location in memory as the key to a DES decryption routine 122. The other input to the decryption cycle 122 is the third master key encrypted session key e[KM$_3$](KS$_n$). The output from the decryption cycle 122 is the session key KS$_n$ which is supplied as the key to a MAC computation cycle 124. The primary inputs to the MAC computation cycle 124 are the encrypted PINc and the nonencrypted message information, both derived from the extended transaction request message 107. The output of the MAC computation cycle 124 and the MAC1 from the transaction request message 107 are compared with each other at step 126 to generate instruction signals as to whether or not the data processor 108 is to proceed with the remainder of the program.

Assuming that the program is to proceed, the decrypted session key KS$_n$ is supplied as the key to a DES decryption cycle 128 where the encrypted PINc from the transaction request message 107 is decrypted.

The data processor 108, from the PAN contained in the header of message 107, accesses the memory 112 at step 130 to retrieve the PIN, encrypted in a data base key KDB, for that particular PAN. This encrypted PIN is then supplied as one input to a PIN verification decision step 132. The decrypted PINc is encrypted with the data base key KDB at step 134 and is supplied as the other input to the PIN verification step 132. A yes/no decision is then made and is supplied as one input to the authorization decision 134.

The data processor 108 uses the PAN to access the business decision data base portion 136 of the memory 112 to determine whether or not the authorization should be allowed for that PAN. This yes/no decision is also supplied as one input to the authorization decision 134. The net decision output from the step 134 is used to designate the authorization code.

The authorization code, generated at step 138, then becomes one portion of a transaction response message 139. The authorization code is also supplied as one input, along with other selected inputs, including the terminal supplied date and time, to a second message authentication computation MAC2 step 142. The session key KS$_n$ is used as the key to this MAC2 computation step 142. The MAC2 is also a constituent of the response message 139 together with the transaction trace number TTN and a header. This transaction response message 139 is then forwarded to the network switch at step 144.

Referring now more particularly to FIG. 10, it can be seen that the function of the network switch 16 is simply to modify the header of the message 139 at step 145, to create a modified message 140 which is directed to the particular acquirer station at step 146.

Referring now more particularly to FIG. 11, the operation of the acquirer station 12 in processing the transaction response message 140 and forwarding it to the transaction terminal is illustrated. The transaction trace number TTN is used by the processor 66 to look up in the active transaction file 81 the terminal identification TID for the particular transaction terminal which initiated the request. The terminal identifier, for example terminal TX corresponding to that transaction trace number, is then entered into the header of a modified transaction response message 141 to be transmitted to the terminal. The terminal identifier is also entered by the data processor 66 into the solid-state or core memory table 78 and the terminal TX is assigned the next (sequential) previously generated master key encrypted pair of a new session key e[KM$_1$](KS$_{n+1}$) and e[KM$_2$](KS$_{n+1}$) and the corresponding session key authentication code SKAC$_{n+1}$. The second master key encrypted session key of the pair, e[KM$_2$](KS$_{n+1}$) remains temporarily in the table 78, and the first master key encrypted session key, e[KM$_1$](KS$_{n+1}$), and the corresponding SKAC$_{n+1}$ are appended to the transaction response message 141. This message is then forwarded to the TX transaction terminal 10 at step 148.

Referring now more particularly to FIG. 12, the manner in which the transaction terminal processes the transaction response message 141 is illustrated. From its memory 34 the processor 26 extracts the session key KS$_n$ and uses it as the key for a MAC2 computation 150. The inputs to the MAC$_2$ computation 150 include the authorization code and other selected information from the response message. The input also includes various other transaction parameters, such as the date and time, and the terminal identifier number, TID. The output of the step 150 is supplied as one input to a MAC2 validation step 152. The other input of step 152 is the MAC2 received in the transaction response message 141. Assuming that the two MAC2 values are the same, the processor is then enabled to proceed with a potentially authorizable transaction.

The next processing step is to determine if the new first master key encrypted session key e[KM$_1$](KS$_{n+1}$) received in the response message 141, is a unique key. If this key is unique, the terminal will be permitted to execute the transaction function. If this key is not unique, the terminal will halt the transaction and preferably request another session key from the acquirer.

The new session key ($KS_{n+1}$) is processed by first decrypting $e[KM_1](KS_{n+1})$, utilizing the master key $KM_1$ of the terminal in step 153. $KS_{n+1}$ is then used to compute the $SKAC_{n+1}$ in step 155. The computation of the SKAC is similar to the MAC computation process, both of which are discussed below with reference to FIGS. 13 and 14. Although additional inputs may be used, the basic inputs to the SKAC computation are the terminal identifier (TID=TX) and the anticipated session key number (n+1), which is generated by the terminal through incrementing of the value in its key counter 154 from the value n of the session key $KS_n$ used for the current transaction.

In step 156, the newly computed value $SKAC_{n+1}$ is verified relative to the corresponding value received in the response message 141. If these two values are equal, the new first master key encrypted session key is accepted for replacement of the previous key and is stored in memory for use with the next transaction in step 157. At this point, the terminal executes the transaction function by acting on the authorization code contained in the transaction response message. This is done in step 158. This involves, for example, dispensing or denying cash, displaying corresponding messages to the customer, the clerk, the teller, etc., and the printing of a user receipt that indicates the acquirer/ATM identity, the date, and the transaction details.

As can be appreciated, the inclusion of the incremented number n+1 in this SKAC verification process provides assurance that the new session key $KS_{n+1}$ could not have been used previously. Therefore, fraudulent replay of a previous first master key encrypted value could not have occurred.

If the two $SKAC_{n+1}$ values of the verification process are not equal, a system fault or potential fraudulent activity would be indicated. Since this failure to match could result from possible transmission errors, the terminal may request another encrypted session key from the acquirer in step 159. If this second encrypted session key $E[KM_1](KS_{n+2})$ also does not verify with its value $SKAC_{n+2}$, a system fault or potential fraudulent activity is further indicated. To reestablish concurrence between the acquirer and the terminal, a reset command must be requested from the acquirer host. This command transmits not only a new session key, but also the key's number, such as n+3 (or greater), which is used to reset the terminal's key counter 154 thereby reestablishing the number concurrence between the pointer in the session key table 78 in host memory and the terminal's counter 154.

An additional session key load command is required, for example, at the time a new master key $KM_1$ and associated table of preencrypted session keys are provided for the terminal. In such a case, a reset to lower values of the session key number may be desired, and the terminal will accept resetting to a lower number for counter 154 only in response to this command. To preclude potential fraudulent action directed toward reuse of a previously used (lower number) session key, this load command should preferably be executable only under multiple controlled conditions, such as applied to the loading of a new master key $KM_1$. Also, each session key number should preferably be preencrypted with its corresponding session key to provide further assurance against potential fraudulent use of the reset process.

As set forth above, the SKAC computation is carried out by encrypting various inputs under the new session key $KS_{n+1}$. Accordingly, in order to verify the SKAC at the terminal, the newly received session key must first be decrypted. In an alternate approach, the terminal master key $KM_1$ is used to encrypt the SKAC. In the latter case, it would be preferable to include the new, encrypted session key $KS_{n+1}$ as an input to the SKAC computation. By this arrangement, the SKAC can be verified at the terminal, using the terminal master key $KM_1$, without having to initially decrypt the new session key. If the SKAC is verified, the transaction can be processed immediately, and sometime thereafter, the new encrypted session key will be used to replace the old session key $KS_n$.

Referring now more particularly to FIG. 13, the steps taken in computing a typical message authentication code, MAC, for a transaction request type of message are illustrated. This approach is the same as used to compute the SKAC except that the inputs are different, as will be set forth below with reference to FIGS. 13 and 14.

MAC computation comprises concatenating certain data 160 such as the message type, the transaction number, the PAN, the encrypted PINc, the date, the time, other data and zero fill numbers to fill out the last of the 64 bit grouping. Some of these data may be alphabetical, some may be numeric, some may be in hexadecimal form. For example, the first three characters of data in the example are the message type and these may typically be in alphanumeric form. The next three digits are the transaction number and these are usually in numerical form. Next is the PAN which is 16 digits of numeric data followed by the encrypted PINc which is 16 more characters of data in hexadecimal form. The remaining data depend to some extent upon the particular interchange or communications environment.

The first 64 bits 162 of data 160 are input to a DES encryption cycle 164 in which the key is the session key KS. The output of the DES cycle 164 is ciphertext 166. This is Exclusive-ORed by an operator 168 with the second 64 bits of data 170. The output of the Exclusive OR function 168 is supplied as the input to a second DES cycle 172 whose key is again the session key KS. The ciphertext output 174 of DES cycle 172 is then Exclusive-ORed with the next 64 bits which are then encrypted again with the session key KS, and so forth, until the last stage of the MAC computation in which the last N bits 176 plus (64-N) zeros 178 are Exclusive-ORed with the last to be generated ciphertext at step 180 and are encrypted in the last DES cycle 182 with the session key KS. The output of the DES cycle 182 is 64 bits of ciphertext 184. The first 24 bits of this ciphertext 184 comprise a 24 bit MAC 186. The remaining 40 bits 188 are ignored. The reason for selecting the 24 bit MAC is arbitrary and is simply to decrease the communication time required to transmit the MAC without significantly sacrificing the security that it provides.

Referring now more particularly to FIG. 14, some of the off-line batch functions of the acquirer which are required prior to on-line end-to-end encryption are illustrated. Specifically the process by which the acquirer batch generates the session keys is illustrated. It should be understood that these steps are carried out by a temporarily secured host data processor 66 or by a security module 14 of the acquirer. At step 190 a generator of a sequence of random numbers generates a series of 64-bit number combinations. Each 64-bit number passes through a parity-set step 192 which ensures that each byte making up the 64 bits has odd parity.

The results of the parity step 192 are the prospective session keys. At step 196 each of the session keys is compared with a table of weak keys 194 and any such weak keys are rejected. There are several types of weak keys. One such type is known as a self-dual key. With such a key, a stream of data which are encrypted twice by the same key will result not in cipher text but in the original clear text. In another type of weak key, known as a dual key, data which are encrypted by the first of the dual keys result in a ciphertext which, when it is thereafter encrypted by the second of the dual keys, will produce the original cleartext instead of ciphertext. In addition, there are certain other types of keys, although not technically weak keys, which are to be rejected, such as a session key made up of all zeros, for example. Each allowed session key from step 196 is then encrypted with both a terminal master key $KM_1$ at step 198 and with an interchange switch master key $KM_2$ at step 200. The steps 198 and 200 are the DES cycles referred to above.

In addition, the session key authentication code (SKAC) is computed in step 199 for each session key to permit verification by the terminal that the key is unique and never previously used. This SKAC computation is similar to the MAC computation previously described. A minimal set of inputs to the computation consists of the terminal identifier (TID) and the contents of the session key counter 201 that is incremented for each key. At step 202, the encryption pairs of session keys encrypted with the first and second master keys, the key numbers and the associated session key authentication codes are stored in table 78 of the memory 70 of the acquirer for subsequent on-line use at the time of transaction.

While there have been described above various arrangements of transaction execution systems in accordance with the invention for the purpose of illustrating the manner in which the invention may be used to advantage, it will be appreciated that the invention is not limited thereto. Accordingly, any modification, variation or equivalent arrangement within the scope of the accompanying claims should be considered to be within the scope of the invention.

I claim:

1. A method of operating a network/interchange transaction execution system of the type comprising a plurality of transaction terminals, a plurality of acquirer stations, each being associated with one or more separate transaction terminals, a plurality of issuer stations, each of which includes a data processor which stores account information for a plurality of accounts, and a network switch which communicatively interconnects the acquirer stations with the issuer stations, the method comprising the steps of:
   (a) generating, encrypting and storing at each said acquirer station, a plurality of encrypted pairs of session keys for each terminal, each key being encrypted once in a first master key and once in a second master key, and, in addition, computing a session key authentication code (SKAC) unique to each encrypted pair of session keys;
   (b) receiving and identifying network/interchange transaction information and a personal identification number, PINc, from a user at one of said transaction terminals, encrypting the PINc with a first session key, $KS_n$, transmitting to the acquirer station associated with said transaction terminal a network/interchange request message comprised of the encrypted PINc and the transaction data;
   (c) at the associated acquirer station, receiving the network/interchange request message from said transaction terminal and retransmitting the network/interchange request message to the network switch along with the session key encrypted in a second master key, $e[KM_2](KS_n)$;
   (d) at the network switch, receiving the network/interchange request message and the encrypted session key, reencrypting the session key in a third master key, $e[KM_3](KS_n)$, and retransmitting the network/interchange request message along with the third master key encrypted session key to a particular issuer station specified by data in the network/interchange request message;
   (e) at the issuer station, receiving the request message and the encrypted session key, $e[KM_3](KS_n)$, decrypting the session key, decrypting the encrypted PINc, accessing the data base for the account specified in the transaction data, comparing and verifying the PINc with a corresponding PIN stored in the data base for that account, specifying an authorization code, to the acquirer station through the network switch;
   (f) at the acquirer station, appending a new first master key encrypted session key $e[KM_1](KS_{n+1})$ along with the corresponding $SKAC_{n+1}$ to the reply message and relaying the reply message to said transaction terminal; and
   (g) at the terminal, recomputing and verifying the $SKAC_{n+1}$ and acting on the authorization code to respond to the transaction terminal user.

2. A method of operating a network/interchange transaction execution system as recited in claim 1 wherein the computation of said SKAC at the acquirer station is performed by concatenating a terminal identifier with the value in a session key counter associated with that terminal and encrypting the result.

3. A method of operating a network/interchange transaction execution system as recited in claim 1 further comprising the step at said terminal of storing the new encrypted session key $KS_{n+1}$ and discarding the previous session key at the conclusion of the then pending transaction.

4. A method of operating a network/interchange transaction as recited in claim 1 further comprising the step of, at the terminal, requesting a new session key from the acquirer station if the SKAC is not properly verified.

5. A method of operating a network/interchange transaction execution system as recited in claim 1 further comprising the steps of, at said acquirer station, receiving the network/interchange request message from the transaction terminal, locating in storage the second master key encrypted session key, corresponding to the session key used by said transaction terminal to encrypt the PINc, and transmitting said second master key encrypted session key to the network switch.

6. A method of operating a network/interchange transaction execution system as recited in claim 1 further comprising the steps of
   (a) at said transaction terminal, concatenating the PINc and selected elements of the transaction data, computing a first message authentication code, MAC1, using the concatenated data and the session key $KS_n$, and transmitting the MAC1 as part of the network/interchange request message to the acquirer station to be relayed through the network switch to the issuer station;

(b) at said issuer station, recomputing and verifying the MAC1 using the same PINc, the selected data elements, and the decrypted session key $KS_n$, then computing a second message authentication code, MAC2, for the reply message using the session key, $KS_n$, and transmitting the MAC2 to said acquirer station and said transaction terminal through the network switch; and (c) at said transaction terminal, recomputing and verifying the MAC2 using the session key $KS_n$.

7. Improved network/interchange transaction execution apparatus of the type comprising a plurality of issuer stations, each having a host data processor which stores account information for a plurality of accounts, a plurality of transaction terminals, a plurality of acquirer stations, each being connected to at least one, separate transaction terminal, and a network switch station communicatively interconnected between the acquirer stations and the issuer stations, and further comprising:

(a) means at each transaction terminal for receiving the transaction data and a personal identification number, PINc, from a user, for encrypting the PINc with a first session key, $KS_n$, and for transmitting to the acquirer station connected to said transaction terminal, a network/interchange request message comprised of the encrypted PINc and the transaction data;

(b) means at said acquirer station for receiving the network/interchange request message from said transaction terminal and for retransmitting the network/interchange request message, including the session key encrypted in a second master key, $e[KM_2](KS_n)$, to the network switch;

(c) means at the network switch for retransmitting the network/interchange request message to a particular issuer station as specified in transaction data of the network/interchange request and for reencrypting the session key from second master key encryption to encryption in a third master key, $e[KM_3](KS_n)$;

(d) means at said issuer station for receiving the network/interchange request message, including the encrypted session key, $e[KM_3](KS_n)$, for decrypting the session key, for encrypting the encrypted PINc, for accessing the data base for the account specified in the transaction data, for comparing and verifying the PINc with the corresponding PIN stored in the data base for that account for specifying the authorization code in response to the transaction data, and for transmitting the authorization code to the network switch for relay to said acquirer station;

(e) means at said acquirer station for generating, encrypting and storing a plurality of encrypted pairs of session keys for each terminal, each key being encrypted once in a first master key and once in a second master key and, in addition, computing a session key authentication code SKAC unique to each encrypted pair of session keys, and means at said acquirer station for appending a new first master key encrypted session key $e[KM_1](KS_{n+1})$ along with the corresponding $SKAC_{n+1}$ to the authorization code and relaying the authorization code to the transaction terminal; and (f) means at said transaction terminal for recomputing and verifying the $SKAC_{n+1}$ and acting on the authorization code to respond to the transaction terminal user.

8. Transaction execution apparatus as recited in claim 7 wherein said means at said acquirer station for computing said SKAC includes a session key counter and operates by concatenating the terminal identifier and the value in said session key counter, and encrypting the result under the session key.

9. Transaction execution apparatus as recited in claim 7 further comprising means at said transaction terminal for replacing the new session key received by the acquirer station and discarding the previously received key at the conclusion of the then pending transaction if the SKAC has been verified.

10. Transaction execution apparatus as recited in claim 7 wherein the verification means at said will generate at least one request for a new session key from the acquirer station if the SKAC is not properly verified.

11. Transaction execution apparatus as recited in claim 7 further comprising:

(a) means at said transaction terminal for concatenating the PIN and selected elements of the transaction data, for computing a first message authentication code, MAC1, using the concatenated data and the session key $KS_n$, and for transmitting the MAC1 as part of the network/interchange request message to said acquirer station;

(b) means at said issuer station for recomputing and verifying the MAC1 using the same PINc and selected elements, for computing a second message authentication code, MAC2, using the session key $KS_n$, and for transmitting a response message including the MAC2 to said transaction terminal via the network switch and said acquirer station; and (c) means at said transaction terminal, for recomputing and verifying the MAC2 using the session key $KS_n$.

12. Transaction execution apparatus as recited in claim 7 further comprising means at said acquirer station for receiving the network/interchange request message from said transaction terminal, for locating in storage the corresponding second master key encrypted session key which is the same session key used to encrypt the PINc at the transaction terminal, and for transmitting the second master key encrypted session key to the network switch.

* * * * *